(12) United States Patent
Astley et al.

(10) Patent No.: US 7,388,534 B2
(45) Date of Patent: Jun. 17, 2008

(54) ADAPTIVE DATA ACQUISITION FOR AN IMAGING SYSTEM

(75) Inventors: Oliver Richard Astley, Clifton Park, NY (US); John Eric Tkaczyk, Delanson, NY (US); Naresh Kesavan Rao, Clifton Park, NY (US); James Walter LeBlanc, Niskayuna, NY (US); Wen Li, Clifton Park, NY (US); Yanfeng Du, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/458,713

(22) Filed: Jul. 20, 2006

(65) Prior Publication Data

US 2008/0018505 A1    Jan. 24, 2008

(51) Int. Cl.
*H03M 1/12*    (2006.01)
(52) U.S. Cl. ........................... 341/155; 341/157
(58) Field of Classification Search ................ 341/159, 341/155, 172, 161, 162, 134, 135, 157; 375/237, 375/238
See application file for complete search history.

(56) References Cited

U.S. PATENT DOCUMENTS

| | | | |
|---|---|---|---|
| 4,528,450 A | 7/1985 | Valenta | 250/362 |
| 4,591,984 A | 5/1986 | Mori | 250/363.07 |
| 4,968,898 A | 11/1990 | Hushimi et al. | 327/167 |
| 5,748,134 A | 5/1998 | Dent | 341/172 |
| 6,175,323 B1 | 1/2001 | Flynn | 341/156 |
| 6,278,395 B1 | 8/2001 | Ito et al. | 341/166 |
| 6,366,231 B1 | 4/2002 | Rao et al. | 341/166 |
| 6,498,335 B2 | 12/2002 | Modlin et al. | 250/214 |
| 6,759,658 B2 | 7/2004 | Overdick et al. | 250/336 |
| 7,095,354 B2 * | 8/2006 | Harrison et al. | 341/159 |
| 2001/0048383 A1 | 12/2001 | Nagaraj | 341/159 |
| 2002/0093447 A1 | 7/2002 | Li | 341/158 |
| 2002/0196172 A1 | 12/2002 | Bult | 341/158 |
| 2003/0053587 A1 | 3/2003 | Demharter | 378/19 |
| 2004/0113678 A1 | 6/2004 | Welles, II et al. | 327/336 |

* cited by examiner

*Primary Examiner*—Peguy JeanPierre
(74) *Attorney, Agent, or Firm*—Jason K. Klindtworth; Curtis B. Brueske

(57) ABSTRACT

An adaptive data acquisition circuit (26) includes an amplifier (14) for amplifying electrical pulses generated by a detector (12) responsive to energy incident at the detector. The adaptive data acquisition circuit also includes a counting circuit (28) for counting amplified electrical pulses generated by the amplifier. In addition, the adaptive data acquisition circuit includes a digital logic circuit (30) for determining a pulse parameter indicative of a pulse rate and an amount of energy present in the amplified electrical pulses and for generating a control signal (34) responsive to the pulse parameter for controlling an operating parameter of the data acquisition circuit.

33 Claims, 2 Drawing Sheets

ADAPTIVE DATA ACQUISITION FOR AN IMAGING SYSTEM

FIELD OF THE INVENTION

The present invention relates to imaging systems, and, more particularly, to an adaptive data acquisition circuit for an imaging system.

BACKGROUND OF THE INVENTION

FIG. 1 illustrates a conventional data acquisition circuit 10 for use in imaging systems, for example, computer tomography (CT) systems, to count energy quanta received from a target being imaged. Such circuits 10 typically include a detector 12 generating current charge pulses responsive to received energy 11, such as x-ray photons incident on the detector 12. The output from such a system may include pulse counts 64. An amplifier 14, such as an integrating trans-impedance amplifier, typically comprising an operational amplifier (op amp) 15 with an integrating capacitor 16, resistor element 18, and low impedance switch 119 connected in feedback between an inverting terminal and an output terminal of the op amp 15, converts the current charge pulses into voltage pulses. Optionally, parallel integration processing of the amplifier output 19 via a sample and hold circuit 74 and an analog to digital converter 72 may be used to provide a digital integration output signal 70 indicative of the power of radiation 11 received at the detector 12.

Resistor 18 and switch 119 may not necessarily be discrete devices, but may be implemented using one or more transistors, such as a Field Effect Transistors (FETs) where the resistance of such a device may be controllable by an applied voltage. Alternately, the switch 119 may be light activated such that it is closed by application of light pulse incident on the switch. The resistive element 18 provides for the reset of charge built up across the capacitor 16 as the op amp 15 responds to the charge pulses from detector 12.

A continuous reset circuit is a type of circuit having a constant resistance value for resistor element 18. A triggered reset circuit is a type of circuit that implements the low impedance switch 119 in the feedback circuit. Most of the time the low impedance switch 119 is configured in the open state and the charge from the detector 12 is integrated on the capacitor 16 with constant reset from resistance 18. The switch 119, for example, under control of a threshold circuit or periodic clock, closes for a short period in order to discharge an accumulated charge on capacitor 16 and prevent saturation of op amp 15. During the period of time when the switch 119 is closed, there is no response to charge pulses generated in detector 12. Therefore, it is desirable to minimize the period when the switch 119 is closed in order to detect all the X-rays incident to the detector. An example of threshold controlled circuit is a type of circuit that tests the direct current level of the op amp output 19 against a threshold and closes the switch 119 for a fixed number of clock cycles in order to discharge the capacitor 16.

The voltage pulses generated by the amplifier 14 are further processed by a pulse shaper 20 to generate a shaped voltage pulse that is provided to a discriminator 22. The discriminator 22 increments a count register 24 when the amplitude of the shaped voltage pulse exceeds a discrimination threshold. Accordingly, the data acquisition circuit 10 is configured for counting current charge pulses generated by the detector 12 that are representative of photons incident on the detector 12. Multiple counters 24 and correspondingly multiple discriminator thresholds may be used to bin events with respect to the shaped pulse amplitude. Multiple discrimination and counting into multiple bins is a coarse method for recording the energy of the photons incident on the detector 12. In some applications, the detector 12 may comprise one or more pixels, wherein one or more pixels are connected to a respective data acquisition circuit 10 via a binning switch 40.

In imaging systems such as CT systems, it is desired to achieve a relatively high count capability with sufficient energy resolution. In particular, avoidance of saturation of the amplifier at high count rates requires that a relatively low resistance resister 18 be used in the circuit 10 or that the switch 119 be reset often. However, a low resistance resistor 18 may result in decreased energy resolution due in part to the known phenomenon of ballistic deficit. Ballistic deficit results because the resistor 18 discharges the capacitor 16 during the period in which the signal charge pulse generated in detector 12 is being received at the input 17 of the op amp 15. An amplitude of a charge integrated on capacitor 16 is thereby decreased and, with reference to a noise level, there is a decrease in energy resolution of the circuit. Furthermore, the amplitude may be variable due to differences in the time duration of different charge pulses created in the detector 12. Variability in a charge pulse amplitude results in a decreased energy resolution of the circuit.

Energy resolution may also be affected by a shaping time of the pulse shaper 20. The longer the shaping time used by the pulse shaper 20, the better the higher frequency noise can be rejected, resulting in lower noise in a shaped voltage pulse. However, if the shaping time is made too long, this may result in excessive circuit dead time that can lead to overlap of shaped pulses and a distortion in the amplitude of the shaped pulse. In such a case there may be miscounting in the discriminator 22 and error in an energy assignment. Consequently, as a count rate increases, each shaped voltage pulse may incorporate signals from multiple detection events in an effect known as pile up. Accordingly, it is desired to improve the performance of an imaging data acquisition circuit over a wide range of energy input conditions.

DETAILED DESCRIPTION OF THE INVENTION

In data acquisition circuits of imaging systems such as CT systems, there is a need to achieve a desired energy resolution over a wide range of energy detection conditions. For example, a conventional photon counting data acquisition circuit of a CT system needs to be able to provide sufficient energy resolution at both relatively low count rates and at relatively high count rates. The inventors have innovatively realized that by dynamically modifying operating parameters of a imaging data acquisition circuit, a desired energy resolution may be achieved over a broad range of photon counting rates. In particular, by controlling an operating parameter of the imaging data acquisition circuit responsive to a pulse parameter indicative of the pulse rate and integrated charge, a desired energy resolution for varying count rate conditions may be achieved.

Figure 2:
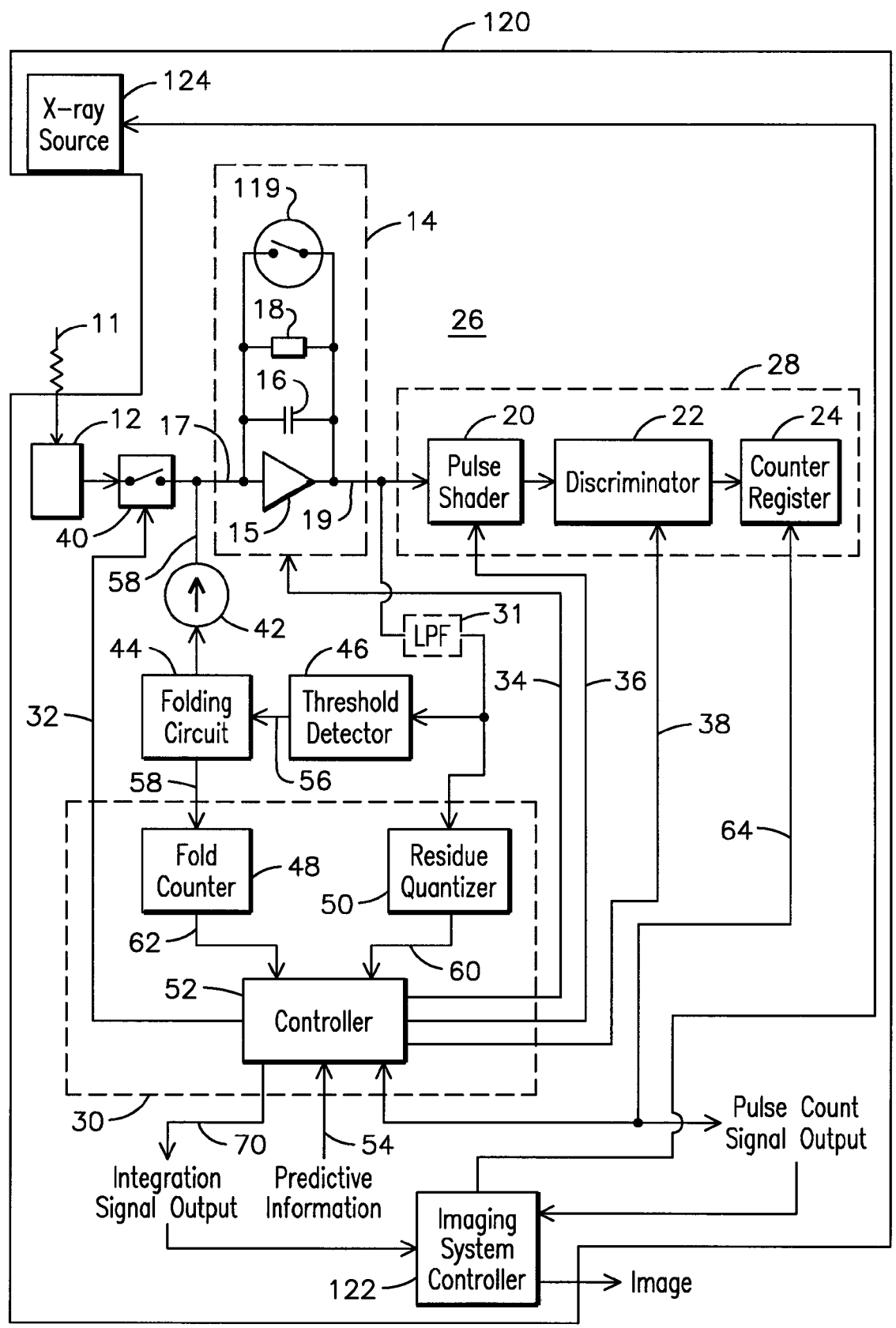
FIG. 2 is a schematic diagram of an example embodiment of an adaptive data acquisition circuit for use in imaging systems.

FIG. 2 is a schematic diagram of an example embodiment of an adaptive data acquisition circuit 26 for use in an imaging system 120. The data acquisition circuit 26 includes an amplifier 14, such as an integrating trans-impedance for amplifying electrical charge pulses generated by detector 12 responsive to energy 11 incident at the detector 12, such as x-ray photons. In an aspect of the invention, the amplifier 14 may be controllable to allow varying its operating parameters, such as amplification and reset parameters, by dynamically controlling values of the resistor 18 and/or capacitor 16 in conjunction with an expected flux rate of x-ray photons received at the detector 12.

The data acquisition circuit 26 also includes a counting circuit 28 for counting amplified electrical pulses generated by the amplifier 14. The counting circuit 28 may also be configured for binning into different count registers (not shown) according to pulse amplitude. The counting circuit 28 may include pulse shaper 20 for shaping the amplified electrical pulses generated by the amplifier 14 and providing the shaped pulses to discriminator 22. In an aspect of the invention, the pulse shaper 20 may be controllable to vary its operating parameters, such as a pulse shaping time and number of shaping filters. The discriminator 22 may be coupled to the pulse shaper 20 to increment one or more count registers 24 when a shaped voltage pulse exceeds one or more discrimination thresholds. The discriminator 22 may also be controllable to vary its operating parameters, such as a discrimination threshold.

To prevent a saturation condition of the amplifier 14, the data acquisition circuit 26 may include folding circuitry for subtracting packets of charge from an input of the amplifier 14. For example, the folding circuitry may include a threshold detector 46 coupled to the amplifier output 19 for generating a threshold exceeded signal 56, for example, such as when an output of the amplifier 14 exceeds a predetermined threshold. In an embodiment of the invention, the threshold detector 46 may include a mean level sample and hold circuit for identifying a mean output and generating the threshold exceeded signal 56 when the mean output exceeds the threshold. The mean level can be implemented as a low pass filter 31 at the output 19 of the amplifier 14.

The folding circuitry may also include a folding circuit 44 coupled to the threshold detector 46 for applying a fold current 58 to the amplifier input 17 responsive to the threshold exceeded signal 56. The folding circuit 44 may control a current source 42 that subtracts a desired charge from the amplifier input 17 to prevent saturation of the amplifier 14. In an embodiment, the current source 42 may include a constant current source activated for a fixed time interval for subtracting a constant, predetermined charge to achieve a desired level of charge subtraction at the amplifier input 17. The activation of the current source 42 is known as a fold, and the number of such folds can be counted in the fold counter 48. High accuracy of the fold charge injected 58 to the amplifier input 17 may be ensured in the folding circuit 44 which activates the current source 42 for a certain number of clock cycles. The current level of the constant current source 42 and the number of clock cycles may be dynamically adjustable parameters in order to accommodate the specific count rate and charge level received from the detector 12.

To achieve improved performance over a wide range of imaging energy input conditions, the data acquisition circuit 26 may include a digital logic circuit 30 for determining a pulse parameter indicative of a present or possible future count rate. The predictive capability of the logic controller 52 with respect to future count rate can be implemented based on trend analysis or through the predictive information 54 provided by the imaging system 120 Based on the pulse parameter, the data acquisition circuit 26 may provide one or more control signals responsive to the pulse parameter for controlling an operating condition of the data acquisition circuit 26. The digital logic circuit 30 may be coupled to the amplifier output 19 and/or the folding circuit 44 for receiving information indicative of the count rate and an amount of energy present in an amplified signal 19 from one, or both, of these sources. Based on a determined pulse parameter, the digital logic circuit 30 generates one or more control signals for controlling an operating parameter of the data acquisition circuit 26.

In an example embodiment, the control signal 34 may be configured for controlling an amplification parameter of the amplifier 14, such as by controlling a capacitance of capacitor 16 and/or controlling a resistance of resistor 18 and/or the reset frequency through switch 119. In an aspect of the invention, control signal 34 may be configured for shorting the resistor 18 to reset the amplifier 14. In another example embodiment, control signal 36 may be configured for controlling an operating parameter of the pulse shaper 20, such as a shaping time of the pulse shaper 20 to achieve a desired performance of the data acquisition circuit 26. For example, control signal 36 may control the pulse shaper 20 to use a relatively longer shaping time when a determined pulse parameter is relatively low, for example to improve energy resolution. Alternatively, when a determined pulse parameter is relatively high, the control signal 36 may be configured for controlling the pulse shaper 20 to use a relatively shorter shaping time, for example, to avoid pile-up. In another aspect of the inventions, control signal 38 may be configured for controlling an operating parameter of the discriminator 22, such as by controlling a discrimination threshold of the discriminator 22 to achieve a desired performance of the data acquisition circuit 26.

In an embodiment of the data acquisition circuit 26 that includes a pixel binning switch 40 positioned between the amplifier 14 and the detector 12, control signal 32 may be configured for controlling an operation of the switch 40 to selectively couple and decouple the amplifier 14 from one or more sub-pixels areas of the detector 12 responsive to a pulse parameter. For example, at a relatively low flux rate of incident radiation 11 to the detector 12, the sub-pixels may be configured such that all pulse events received on the total area of the sub-pixels is routed to the amplifier 14. Alternately, at relatively high count rates some subset of sub-pixels areas, possibly one, may be routed to the amplifier 14. By this means, the active responsive area of the detector 12 is dynamically controlled such that the pulse count rate received at the input to amplifier 14 is maintained within a smaller dynamic range than a flux rate of radiation 11 incident to the detector 12.

The digital logic circuit 30 may include a fold counter 48 receiving a fold indication 58 provided by the folding circuit 44. The fold counter 48 may be configured for counting a number of times a fixed unit of charge is subtracted from the amplifier input 17, thereby providing an indication of the integrated charge in a series of amplified pulses received from the detector 12. A fold count 62 generated by the fold counter 48 may be provided to a controller 52. The controller 52 may be configured for using the fold count to generate control signals 32, 34, 36, 38 for controlling respective operating parameters of the data acquisition circuit 26 in response to the fold count 62. The fold count 62 can be provided by the controller 52 as the integration signal 70 which is representative of the power of radiation 11 received at the detector 12.

In another embodiment, the digital logic circuit 30 may include a residue quantizer 50 for generating a residue signal 60 responsive to a residue of an amplified pulse remaining at the amplifier output 19, for example, after application of a folding current 58. The controller 52 may be coupled to the residue quantizer 50 for using the residue signal 60, for example, in conjunction with the fold count 62, to generate control signals 32, 34, 36, 38. The signal 60 from the residual quantizer 50 may be provided by the controller 52 as the integration signal 70 representative of the power of radiation 11 received at the detector 12.

In another aspect of the invention, digital logic circuit 30 may be further configured for receiving predictive information 54, such as information indicative of an expected pulse parameter, for generating one or more control signals responsive to the predictive information 54. Such predictive information 54 may be based on trend analysis of previously amplified pulse parameters, energy received at adjacent pixels of the detector 12, or a known density profile of a target being imaged by an imaging system using the data acquisition circuit 26.

In yet another embodiment, a counter output 64 of the counting circuit 28 may be used by the digital logic circuit to generate control signals for controlling operational parameters of the data acquisition circuit 26. For example, the counter output 64 may be used by controller 52 to generate a control signal 32 to control the binning switch responsive to different energy thresholds counts, such as may be provided by counting circuit 28 according to different discrimination thresholds of the discriminator 22.

In another aspect of the invention, a fold count 62 and residual quantizer signal 60 may be provided as the integration signal output 70 and the counter signal 64 may be provided as the pulse count output signal. An imaging system controller 122 may be configured for using the integration signal output 70 and the pulse count output signal for generating an image. Furthermore, such information can be used by the imaging system 120 to generate vectors which may control the acquisition sequence and flux level profiles created by an X-ray source 124 of the imaging system 120.

In another aspect of the invention, a fold count may be used as a photon count, for example, when a fold threshold is relatively small and the fold count is reported relatively often, to generate appropriate control and output signal(s). In this case, the fold threshold is indicative of the energy of a received photon, thereby allowing the data acquisition circuit 26 to generate a control signal in about one tenth of a time of a typical x-ray imaging inter-pulse period. Accordingly, the fold count generated in this manner may be directly representative of a photon count which may be used for controlling an operating parameter of the data acquisition circuit 26. Similarly, a two energy level photon counting technique may be used when a photon arrival at the detector triggers two folds.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An adaptive data acquisition circuit comprising:
   an amplifier for amplifying electrical pulses generated by a detector responsive to energy incident at the detector,
   a counting circuit for counting amplified electrical pulses generated by the amplifier;
   a digital logic circuit for determining a pulse parameter indicative of a pulse rate and an amount of energy present in the amplified electrical pulses and for generating a control signal responsive to the pulse parameter for controlling an operating parameter of the data acquisition circuit; and
   a pulse shaper receiving the amplified electrical pulses and generating shaped pulses, wherein the control signal is configured for controlling a shaping time of the pulse shaper.

2. The adaptive data acquisition circuit of claim 1, wherein the control signal is configured for controlling an amplification parameter of the amplifier.

3. The adaptive data acquisition circuit of claim 2, wherein the amplifier comprises a feedback resistor and reset switch, wherein the control signal is configured for controlling a resistance of the feedback resistor and a reset frequency of the amplifier by controlling an operation of the reset switch to selectively short the feedback resistor.

4. The adaptive data acquisition circuit of claim 2, wherein the amplifier comprises a feedback capacitor, wherein the control signal is configured for controlling a capacitance of the feedback capacitor.

5. The adaptive data acquisition circuit of claim 1, wherein when a level of the pulse parameter is relatively low, the control signal is configured for controlling the pulse shaper to produce a relatively longer shaping time.

6. The adaptive data acquisition circuit of claim 1, wherein when a level of the pulse parameter is relatively high, the control signal is configured for continuing the pulse shaper to produce a relatively shorter shaping time.

7. The adaptive data acquisition circuit of claim 1, further comprising a discriminator receiving shaped pulses from the pulse shaper, wherein the control signal is configured for adjusting a discrimination threshold of the discriminator.

8. The adaptive data acquisition circuit of claim 1, further comprising a switch between the detector and the amplifier, wherein the control signal is configured for operating the switch to selectively couple and decouple the amplifier from a plurality of subprxels of the detector.

9. The adaptive data acquisition circuit of claim 1, wherein the digital logic circuit is further configured for generating a control signal responsive to predictive information.

10. The adaptive data acquisition circuit of claim 1, wherein the predictive information comprises a predicted pulse parameter.

11. The adaptive data acquisition circuit of claim 1, wherein the digital logic circuit is further configured for generating a control signal responsive to a pulse count generated by the counting circuit.

12. An imaging system comprising the adaptive data acquisition circuit of claim 1.

13. The imaging system of claim 12, wherein the control signal represents an integration signal used for controlling an operation of the imaging system.

14. The imaging system of claim 13, wherein a counting circuit output is used for controlling an operation of the imaging system.

15. An adaptive data acquisition circuit comprising: an amplifier for receiving current purses from an energy detector coupled to an amplifier input and for generating corresponding amplified pulses at an amplifier output a counting circuit coupled to the amplifier output for counting amplified electrical pulses generated by the amplifier;
- a threshold detector coupled to the amplifier output for generating a threshold exceeded signal when an amplified electrical pulse exceeds a predetermined threshold;
- a folding circuit coupled to the threshold detector for applying a folding charge to the amplifier input responsive to the threshold exceeded signal;
- a fold counter coupled to the folding circuit for generating a fold count responsive to a number of times the folding charge is applied to the input of the amplifier; and
- a controller coupled to the fold counter for generating a control signal responsive to the fold count for use in controlling at least one operating parameter of the data acquisition circuit.

16. The system of claim 15, further comprising a residue quantizer for generating a residue signal responsive to a residue of an amplified pulse remaining at the amplifier output after application of the folding current.

17. The system of claim 16, further comprising a low pass filter coupled between the amplifier output and the threshold detector and the residue quantizer for filtering the amplified pulses.

18. The system of claim 16, wherein the controller is coupled to the residue quantizer and is further configured for generating the control signal responsive to the residual signal for use in controlling the at least one operating parameter of the adaptive data acquisition circuit.

19. In an imaging data acquisition circuit comprising a detector generating electrical pulses responsive to energy incident at the detector and an amplifier receiving the electrical pulses from the detector and generating amplified electrical pulses, a method for acquiring imaging data comprising:
- counting amplified electrical pulses received from an amplifier of an imaging data acquisition circuit;
- determining a pulse parameter indicative of a pulse rate and an amount of energy present in the amplified electrical pulses; and
- controlling an operating parameter of the data acquisition circuit responsive to the pulse parameter, wherein controlling an operating parameter of the data acquisition circuit includes controlling a shaping time of a pulse shaper.

20. The method of claim 19, wherein controlling an operating parameter comprises controlling an amplification parameter of the amplifier.

21. The method of claim 19, wherein controlling an amplification parameter of the amplifier comprises controlling a resistance of a feedback resistor of the amplifier and shorting of the feedback resistor.

22. The method of claim 19, wherein controlling an amplification parameter of the amplifier comprises controlling a capacitance of a feedback capacitor of the amplifier.

23. The method of claim 19, wherein when a level of the pulse parameter is relatively low, controlling a shaping time of the pulse shaper comprises controlling the pulse shaper to produce a relatively longer shaping time.

24. The method of claim 19, wherein when a level of the pulse parameter is relatively high, controlling a shaping time of the pulse shaper comprises controlling the pulse shaper to produce a relatively shorter shaping time.

25. The method of claim 19, wherein the imaging data acquisition circuit further comprises a discriminator receiving shaped pulses from the pulse shaper, wherein controlling an operating parameter of the data acquisition circuit comprises adjusting a discrimination threshold of the discriminator.

26. The method of claim 19, wherein the imaging data acquisition circuit further comprises a switch between the detector and the amplifier, wherein controlling an operating parameter of the data acquisition circuit comprises operating the switch to selectively couple and decouple the amplifier from the detector.

27. The method of claim 19, further comprising generating the control signal responsive to predictive information.

28. The method of claim 27, wherein the predictive information comprises a predicted pulse parameter.

29. The method of claim 19, further comprising generating a control signal responsive to a pulse rate count of amplified electrical pulses.

30. In an imaging data acquisition circuit comprising a detector generating current pulses responsive to energy incident at the detector, an amplifier receiving the electrical pulses from the detector at an amplifier input and generating amplified electrical pulses at an ampiifier output, and a folding circuit subtracting a charge from the amplifier input responsive to the amplified electrical pulses generated at the amplifier output, a method for acquiring imaging data comprising:
- counting a number of times a current is subtracted from an amplifier input during a pulse amplification period to generate a fold count;
- measuring a residue of an amplified pulse remaining at the amplifier output after subtracting the folding current; and
- generating a control signal responsive to the fold count and the measured residual signal for use in controlling an operating parameter of the imaging data acquisition circuit.

31. An adaptive data acquisition circuit comprising:
- an amplifier for amplifying electrical pulses generated by a detector responsive to energy incident at the detector, wherein the amplifier comprises a feedback resistor and reset switch, wherein the control signal is configured for controlling a resistance of the feedback resistor and a reset frequency of the amplifier by controlling an operation of the reset switch to selectively short the feedback resistor;
- a counting circuit for counting amplified electrical pulses generated by the amplifier;
- a digital logic circuit for determining a pulse parameter indicative of a pulse rate and an amount of energy present in the amplified electrical pulses and for generating a control signal responsive to the pulse parameter for controlling an operating parameter of the data acquisition circuit, wherein the control signal is configured for controlling an amplification parameter of the amplifier; and
- a pulse shaper receiving the amplified electrical pulses and generating shaped pulses, wherein the control signal is configured for controlling a shaping time of the pulse shaper.

32. In an imaging data acquisition circuit comprising a detector generating electrical pulses responsive to energy incident at the detector and an amplifier receiving the electrical pulses from the detector and generating amplified electrical pulses, a method for acquiring imaging data comprising:
- counting amplified electrical pulses received from an amplifier of an imaging data acquisition circuit;

determining a pulse parameter indicative of a pulse rate and an amount of energy present in the amplified electrical pulses; and controlling an operating parameter of the data acquisition circuit responsive to the pulse parameter, wherein controlling an amplification parameter of the amplifier comprises controlling a resistance of a feedback resistor of the amplifier and shorting of the feedback resistor.

33. In an imaging data acquisition circuit comprising a detector generating electrical pulses responsive to energy incident at the detector and an amplifier receiving the electrical pulses from the detector and generating amplified electrical pulses, wherein the imaging data acquisition circuit further comprises a switch between the detector and the amplifier, a method for acquiring imaging data comprising:

counting amplified electrical pulses received from an amplifier of an imaging data acquisition circuit;

determining a pulse parameter indicative of a pulse rate and an amount of energy present in the amplified electrical pulses; and controlling an operating parameter of the data acquisition circuit responsive to the pulse parameter, wherein controlling an operating parameter of the data acquisition circuit comprises operating the switch to selectively couple and decouple the amplifier from the detector.

* * * * *

UNITED STATES PATENT AND TRADEMARK OFFICE
CERTIFICATE OF CORRECTION

PATENT NO. : 7,388,534 B2  Page 1 of 1
APPLICATION NO. : 11/458713
DATED : June 17, 2008
INVENTOR(S) : Astley et al.

Figure 1:
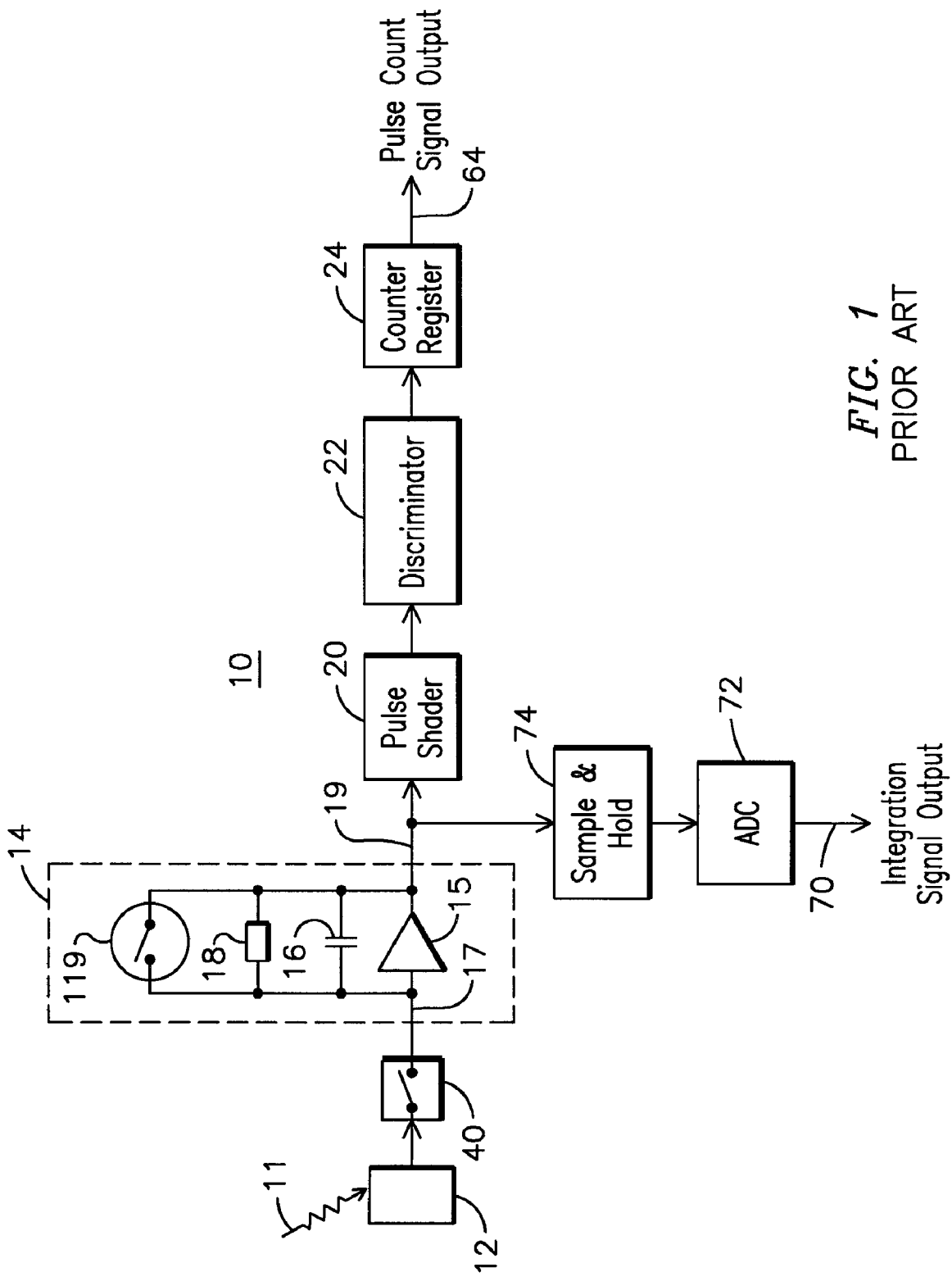
FIG. 1 is a schematic diagram of a known data acquisition circuit for use in an imaging system to count energy quanta received from a target being imaged.

It is certified that error appears in the above-identified patent and that said Letters Patent is hereby corrected as shown below:

In Fig. 1, Sheet 1 of 2, for Tag "20", delete "Pulse Shader" and insert -- Pulse Shaper --, therefor.

In Fig. 1, Sheet 1 of 2, for Tag "24", delete "Counter" and insert -- Count --, therefor.

In Fig. 2, Sheet 2 of 2, for Tag "20", delete "Pulse Shader" and insert -- Pulse Shaper --, therefor.

In Fig. 2, Sheet 2 of 2, for Tag "24", delete "Counter" and insert -- Count --, therefor.

In Column 6, Line 36, in Claim 6, delete "continuing" and insert -- controlling --, therefor.

In Column 6, Line 46, in Claim 8, delete "subprxels" and insert -- subpixels --, therefor.

In Column 6, Line 67, in Claim 15, delete "purses" and insert -- pulses --, therefor.

In Column 7, Line 2, in Claim 15, delete "output" and insert -- output; --, therefor.

In Column 8, Line 21, in Claim 30, delete "ampiifier" and insert -- amplifier --, therefor.

Signed and Sealed this

Twenty-first Day of July, 2009

JOHN DOLL
*Acting Director of the United States Patent and Trademark Office*